Feb. 24, 1942.   D. J. NAUMANN   2,273,881
VARIABLE AIRFOIL
Filed Jan. 21, 1938   2 Sheets-Sheet 1
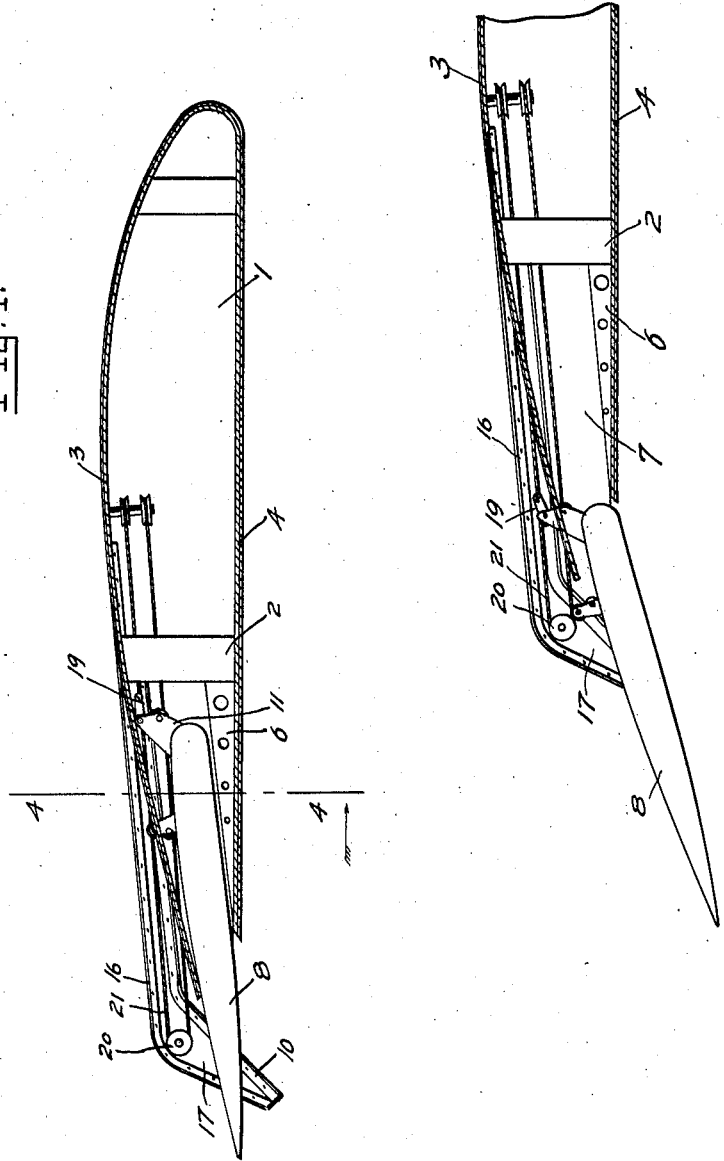
INVENTOR:
D. J. NAUMANN,
BY
ATTORNEYS.

Feb. 24, 1942.　　D. J. NAUMANN　　2,273,881
VARIABLE AIRFOIL
Filed Jan. 21, 1938　　2 Sheets-Sheet 2
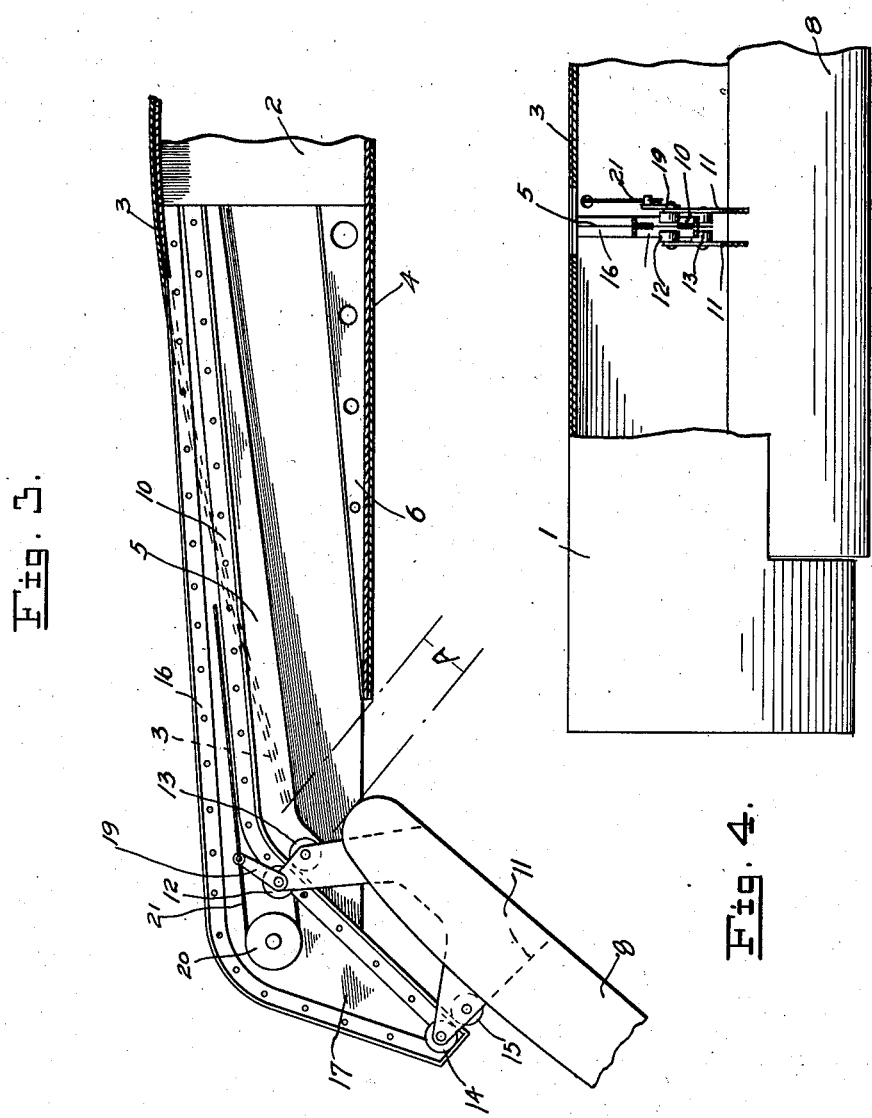
INVENTOR:
D. J. NAUMANN,
BY
ATTORNEYS.

Patented Feb. 24, 1942

2,273,881

UNITED STATES PATENT OFFICE 2,273,881

VARIABLE AIRFOIL

Donald J. Naumann, Inglewood, Calif.

lication January 21, 1938, Serial No. 186,121

8 Claims. (Cl. 244—42)

The present invention relates to aircraft and is particularly directed to means for increasing the lifting power of the wing structure of such aircraft.

It is the object of the invention to provide a wing structure retaining the area, camber, angle of incidence and general outline found most advantageous in aircraft engineering practice, in combination with auxiliary airfoil substantially enclosed within the wing structure while not in use.

It is a further object of the invention to provide improved means of extending the trailing edge of this auxiliary airfoil rearwardly and downwardly of the trailing edge of the wing, thereby to attain greater lifting power.

A further object is the provision of means for projecting the auxiliary airfoil into a position best suited for normal take-off and climbing, and capable of extension into a radically different position of maximum lift under extraordinary circumstances.

The accompanying drawings illustrate a preferred form of the invention, and a detailed description of this structure follows to enable those skilled in the art to construct and build aircraft embodying the invention.

In the drawings:

Fig. 1 is a sectional end elevation of an airplane wing embodying the invention, Fig. 2 is a similar fragmentary view of the wing showing the auxiliary airfoil of the invention in a different position of adjustment, Fig. 3 is an enlarged view substantially in agreement with the foregoing but showing the auxiliary airfoil in fully extended position, and Fig. 4 is a fragmentary plan view of one end of the airplane wing, parts of the surface covering and of the operating mechanism being broken away, substantially on line 4—4 of Fig. 1.

The airfoil, or wing 1, of Fig. 1, represents any approved wing structure provided with the spars and braces accepted as necessary in modern aircraft engineering practice, the numeral 2 designating the main trailing spar of the wing. The portion of the wing structure extending rearwardly from this spar comprises an upper surface 3, continuing the upper curve of the wing, and a lower surface 4 in continuation of the contour of the wing bottom.

Sufficient framing must, of course, be provided to support these surfaces, and such framing may include a series of partition plates 5, 6, of a shape to form an elongated chamber 7, within which the forward portion of the auxiliary airfoil, or flap 8 normally is stored. It is noticed that, in this position, as indicated in Fig. 1, the exposed trailing end of this flap is shaped to complete the proper trailing end contour of the wing, the normal function of which, for this reason, is in no wise impeded. It is important to note that this exposed trailing edge portion end should be as short as possible, the drawing being merely illustrative of the general combination.

Some or all of the plates 5 are fitted at opposite sides along the bottom edge with angle bars disposed in opposite directions to form T-shaped ribs 10 (see also Fig. 4) and these ribs serve as rails upon which the flap 8 is mounted to ride. These rails are, for convenience, shown substantially straight until the trailing edge of the main wing is reached, whereupon they curve downward to continue in a substantially straight line.

The flap 8 is, near the front, made with series of pairs of parallel plates 11, which are spaced to straddle the rails 10, and these plates carry pairs of rollers 12, 13 at the front end and rollers 14, 15 at the rear end, all of which rollers engage the rail on top, at the bottom, and preferably on both sides, or additional rollers may be provided to take the side thrust on the rails. A carriage is, in such manner, provided to ride along the rail for the purpose of extending the flap, and the latter is, in Fig. 2, shown moved rearwardly until its front end is seated in the opening between the upper and lower surfaces 3 and 4. This position of adjustment substantially represents the take-off or climbing position, as well as the landing position of the flap. It is also representative of the cruising position at high altitudes and, for safety, even in low altitudes.

It is noticed that the upper and lower surfaces of the flap, in this position, substantially continue the outline of the upper and lower wing surfaces 3, 4 and that, for this reason, no tendency is present to change the airflow around the wing except, of course, that the additional width of the wing increases the wind resistance at the same time it adds to the lifting power.

A plane carrying a normal load should, with the flap in this position of adjustment, be able to take off and land at much lower air speed than ordinarily necessary and within a much shorter distance. It is, however, sometimes necessary to take off under abnormally heavy load. This may be possible where the runway is relatively unlimited, affording the plane time to attain sufficient speed, but when the flap is fully extended, to the position shown in Fig. 3, it is possible safely to take off from any ordinary landing field. The inclination of the flap, in this position, is so pronounced that the lifting power is greatly increased. The exact angle of inclination of the flap, and the distance of the flap from the trailing edge of the main wing are, of course, proportions to be determined according to the general characteristics of the wing.

The undersurface of the airfoil is continued to the transverse opening or slot A, at the trailing edge, or between the wing surface and the flap. This results in the flow of air to be less turbulent, and hence to cause less drag. The slot A also permits the flow of air to be more pronounced, or to have greater velocity, against the underside of the wing for a given size of opening, causing more lift to be developed. The fact that the lower surface of the main wing is smooth to the airflow is particularly beneficial for take-off and climb, in which cases the drag must be kept to a minimum. The size of the slot is determined by the distance between the trailing edge of the wing surface 4 and the nose of the flap.

Along the bottom of the upper surface 3 is shown fastened a series of angular ribs 16, which extend above and beyond the trailing end of the wing and curve downward to meet the end of the rails 10, to which they are fastened. The spaces between these ribs and the rails may conveniently be occupied by plates 17, which may be continuations of the plates 5, thereby to add strength to the structure. More elaborate devices may, of course, be introduced, it being the purpose of this description merely to point out the necessity of providing strong and rigid framing.

The flap may be substantially the full length of the wing, and it must be operatively connected for operation from the pilot's station, in order that any desired adjustment may quickly be effected. To this end, I have shown pulleys 20 mounted on the side of the plates 17 and shaped to support a cable line 21, extending to suitable operating mechanism (not shown). One pulley near each end of the flap should be sufficient, but more may be added, if preferred. An arm 19 is shown mounted on the wheel truck 11, and it is conveniently journaled on the pivot of the rollers 12, to rise to the upper reach of this cable line, to which it is fastened in any suitable manner.

The drawings disclose one embodiment of the invention which, however, is not limited to the exact structure illustrated, and modifications within the scope of the appended claims may be effected.

I claim:

1. An airfoil having a chamber extending from its trailing end forward, a flap normally seated within said chamber, roller carriages on said flap, a track comprising rails seated within said chamber upon which said carriages are mounted to ride, the said track extending in a substantially straight line to the trailing edge of the wing from which point it is bent diagonally downward a distance substantially the length of said carriages, and means for moving the airfoil along said track.

2. An airfoil having a chamber extending from its trailing end forward, a flap normally seated within said chamber, roller carriages on said flap, a track comprising rails seated within said chamber upon which said carriages are mounted to ride, the said track extending in a substantially straight line from the chamber backwardly through the upper surface of the wing to the trailing edge thereof, from which point it is bent downwardly over said edge and continues diagonally downward a distance substantially the length of said carriages, and means for moving the airfoil along said track.

3. A cambered airfoil having its trailing edge open to provide a chamber extending forwardly, a flap normally seated within said chamber with its trailing edge portion substantially closing the entrance to said chamber, a track extending backwardly along the upper portion of said chamber, and projecting backwardly beyond the chamber, the projecting end of the track being curved downwardly over the trailing edge of the airfoil, the flap being fitted to ride on said track, movement of the flap along the track until the bent portion of the track is reached causing the flap to extend rearwardly substantially in continued extension of the upper and lower airfoil surfaces without break in these surfaces, continued backward movement of the flap to the end of the track causing the flap to assume an inclined position relative to the airfoil and slightly withdrawn therefrom, and means for moving said flap to all of said positions.

4. In an airfoil structure of the class described, an airfoil having a horizontal chamber at and forwardly of its rear edge, the upper and lower surfaces of the airfoil, forming the upper and lower walls of the chamber adjacent said rear edge of the airfoil, being rigid, and the rear edge of the upper surface being positioned backwardly of the corresponding edge of the lower surface, a movable flap normally positioned with its forward portion in the chamber, means on the airfoil for projecting said flap rearwardly with respect to the airfoil, and means for guiding and supporting the flap in various positions when projected, in all such positions substantially one half and more of the rear portion of the flap completing, in substantially unbroken upper and lower surfaces, the upper and lower portions of the airfoil structure.

5. In an airfoil structure of the class described, an airfoil having a horizontal chamber at and forwardly of its rear edge, the upper and lower surfaces of the airfoil, forming the upper and lower walls of the chamber adjacent said rear edge of the airfoil, being rigid, and the rear edge of the upper surface being positioned backwardly of the corresponding edge of the lower surface, a movable flap normally positioned with its forward portion in the chamber, means on the airfoil for projecting said flap rearwardly with respect to the airfoil, and means for guiding and supporting the flap in various positions when projected, in all such positions substantially one half and more of the rear portion of the flap completing, in substantially unbroken upper and lower surfaces, the upper and lower portions of the airfoil structure, the last mentioned means being constructed and arranged for also guiding and supporting the flap wholly beyond the rear edges of the upper and lower surfaces of the airfoil to provide a horizontal opening between the upper and lower sides of the airfoil at the leading edge of the flap.

6. In an airfoil structure of the class described, an airfoil having a horizontal chamber at and forwardly of its rear edge, the upper and lower sides of the chamber being formed by vertically spaced rigid cantilever ledges comprising the rear edge of the airfoil and flush with the upper and lower surfaces thereof, a movable flap normally positioned with its forward portion in the chamber, means on the airfoil for projecting said flap rearwardly with respect to the airfoil, and means for guiding and supporting the flap in various positions when projected, in all such positions substantially one half and more of the rear portion of the flap completing, in substantially unbroken upper and lower surfaces, the upper and lower portions of the airfoil structure.

7. In an airfoil structure of the class described, an airfoil comprising horizontally spaced rigid spars and surface members extending over and connecting the upper and lower sides of the spars, said airfoil having a horizontal chamber extending from the rear spar backwardly through the rear edge, the upper and lower surfaces of the airfoil, forming the upper and lower walls of the chamber, being rigid with respect to the spars, a movable flap normally positioned with its forward portion in the chamber, means on the airfoil for projecting said flap rearwardly with respect to the airfoil, and means for guiding and supporting the flap in various positions when projected, in all such positions substantially one half and more of the rear portion of the flap completing, in substantially unbroken upper and lower surfaces, the upper and lower portions of the airfoil structure.

8. In a structure of the class described, an airfoil comprising horizontal main supporting frame and surface members extending over and secured to the upper and lower sides of the frame, said airfoil having an open horizontal chamber extending inwardly from one edge thereof to the frame, the portions of the surface members bounding said chamber being rigid, providing a uniformly and continuously open chamber, a second but movable airfoil having a portion movable into the chamber and the upper and lower sides of the exposed portion of the second airfoil merging substantially into the upper and lower surfaces of the first airfoil, means for supporting the second airfoil in a position wholly projected from the chamber and spaced from the first airfoil and in a downwardly inclined position with respect thereto, and means for moving the second airfoil to any position between said innermost and extended positions.

DONALD J. NAUMANN.